Oct. 7, 1969  F. G. CIAPETTA ET AL  3,471,265
CATALYTIC MUFFLER DEVICE
Filed Jan. 27, 1965
2 Sheets-Sheet 1
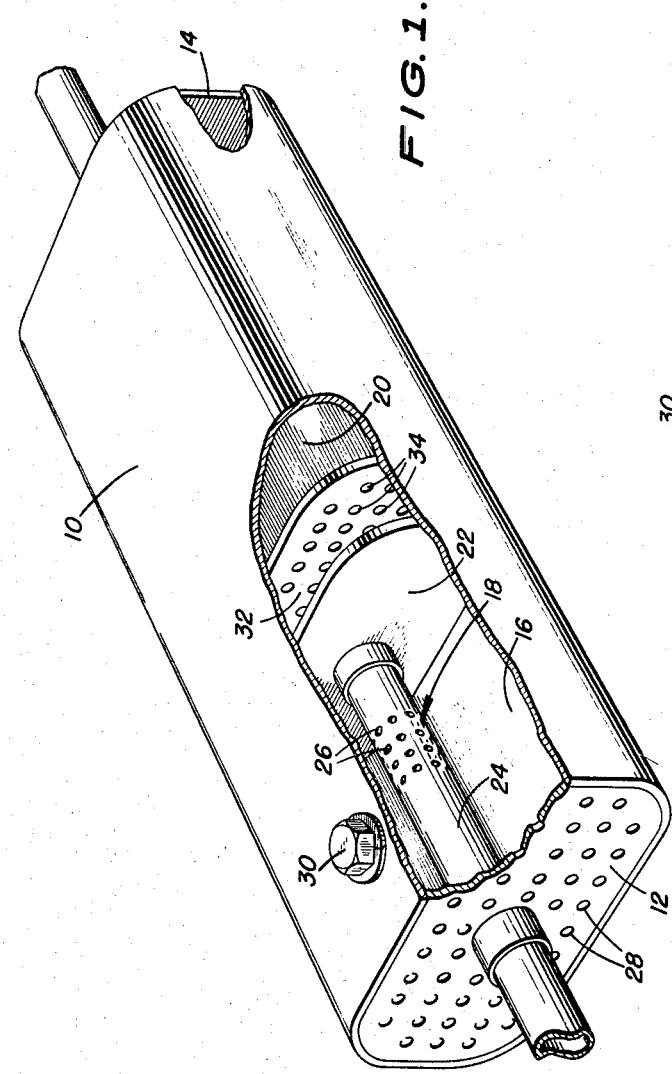
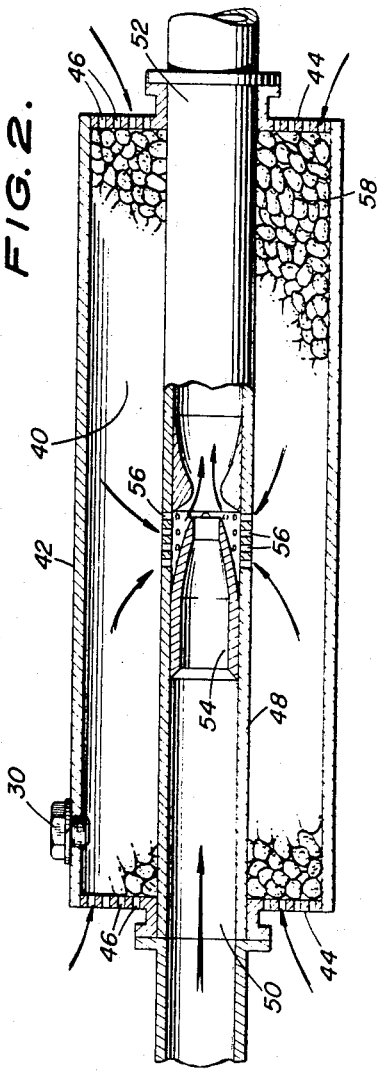
FRANK G. CIAPETTA
DONALD S. HENDERSON
GEORGE A. BAUST
INVENTORS
BY William B. Walker
ATTORNEY

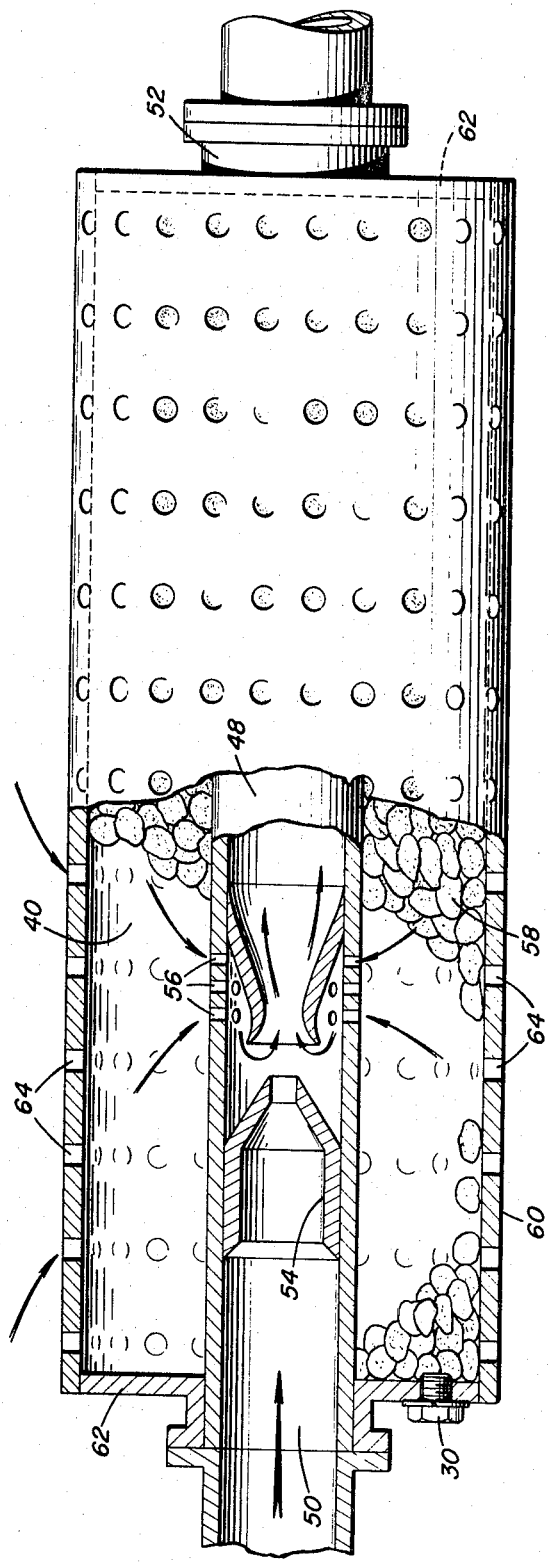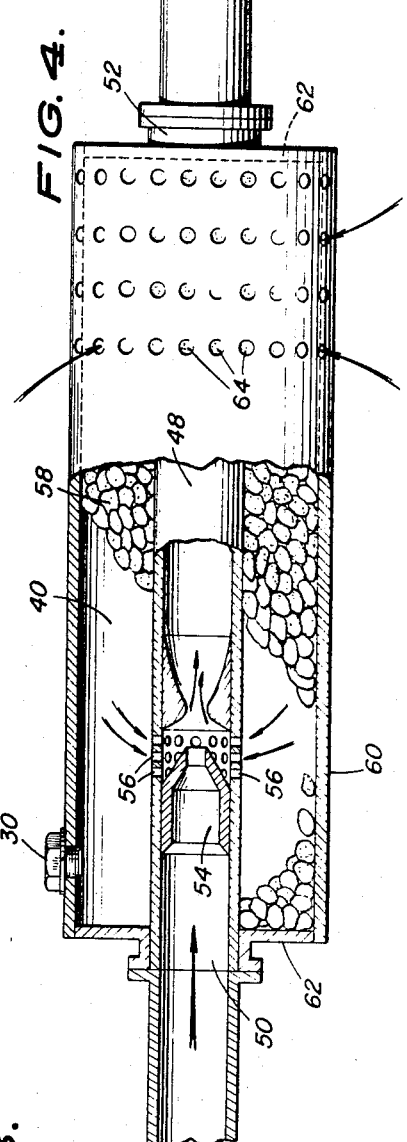

United States Patent Office 3,471,265
Patented Oct. 7, 1969

3,471,265
CATALYTIC MUFFLER DEVICE
Frank G. Ciapetta, Silver Spring, and Donald S. Henderson and George A. Baust, Baltimore, Md., assignors to W. R. Grace & Co., New York, N.Y., a corporation of Connecticut
Filed Jan. 27, 1965, Ser. No. 428,475
Int. Cl. F01n 3/08
U.S. Cl. 23—288                               5 Claims

ABSTRACT OF THE DISCLOSURE

A muffler device for oxidizing undesirable components in exhaust gases wherein secondary air entering the muffler device is passed in contact with a granular bed of sound-damping material. The sound-damping material comprises a granular oxidation catalyst which serves a dual purpose of damping the sound of incoming secondary air and also oxidizing components of exhaust gases which may pass from the device through the secondary air inlet.

---

This invention relates to a catalytic device for oxidizing undesirable components in the exhaust gases of the internal combustion engines. In particular, this invention relates to a low noise level system for mixing air with exhaust gases prior to treatment of the gases in an oxidation catalyst bed.

In summary, the catalytic device of this invention is a system for the elimination of undesirable components in the exhaust gases of internal combustion engines comprising a catalyst containing chamber means having an exhaust gas inlet and outlet for oxidizing vapors in the exhaust gases passing therethrough, conduit means for receiving exhaust gas from an internal combustion engine and delivering it to the exhaust gas inlet of the catalyst containing chamber means including air inspirator means having an air inlet for mixing air with the exhaust gases passing through said conduit means, and a sound-damping means having passageways communicating with the atmosphere for the introduction of air and communicating with the air inlet of the air inspirator for delivering air thereto, said sound-damping chamber containing granules having a particle size within the range of about 0.03 to 0.2 inch. The air inspirator means and the sound-damping chamber can be separately housed from the catalyst containing chamber means. For adequate sound-damping, the distance between the passageways communicating the atmosphere and the air inlet of the air inspirator means should be greater than one inch and preferably greater than 2 inches.

The problem of eliminating the large quantities of poisons and obnoxious fumes present in the exhaust gases from internal combustion engines has been of considerable interest in recent years. One of the relatively successful techniques developed in answer to this problem involves passing a mixture of the exhaust gases and air through a bed of oxidation catalyst whereby undesirable constituents of the exhaust gas are oxidized. Several techniques have been developed for introducing the air into the exhaust gas prior to contact with the oxidation catalyst. The air has been introduced by means of air pumps and venturi-type devices. Venturi-type devices are shown in Patent Nos. 2,674,521 and 2,795,488, for example. The venturi-type devices provide special advantages since the air is drawn into the exhaust gases in response to pressure differentials created by the motion of the exhaust gases through a restriction. The venturi is a self-contained unit, and can be easily installed in the exhaust system of an internal combustion engine. In contrast, the air pump requires a special mounting system, a drive system, special piping, and the installation of such a system is complex and expensive.

Several serious problems have arisen in the use of previously known venturi devices in combination with catalytic beds for oxidation of exhaust gases from internal combustion gases. The large quantities of air which pass through the venturi when the flow of exhaust gas from the engine reaches high flow rates produces a high noise level. Furthermore, when the flow rate of the exhaust is low during certain modes of engine operation, the venturi restriction fails to create a sufficient pressure differential between the exhaust gas and the atmosphere, and instead, some exhaust gas tends to escape from the venturi through the air inlet and into the surrounding atmosphere. This escape of exhaust gas is potentially dangerous to the occupants of the vehicle and contributes to the general pollution of the atmosphere as well.

It is one object of this invention to provide a catalytic device for removing poisons and obnoxious fumes present in the exhaust gases of internal combustion engines, which device operates at low noise levels during all modes of operation of an internal combustion engine.

It is another object of this invention to provide a catalytic device for oxidizing poisons and obnoxious fumes in exhaust gases of internal combustion engines comprising an air inspirator for mixing air with the exhaust gases prior to the contact thereof with oxidation catalysts, and means for eliminating poisonous and obnoxious components in the exhaust gases which tend to escape from the air inspirator during low speed operational modes of the internal combustion engine.

FIGURE 1 is a perspective view of the air-exhaust gas mixing means in combination with the exhaust gas oxidation means in a single housing.

FIGURES 2, 3 and 4 show side-sectional views of several embodiments of the air-exhaust gas mixing device of this invention.

Referring to FIGURE 1, longitudinal shell member 10 and attached end plates 12 and 14 constitute a housing which encloses at one end the sound-damping chamber means 16 and air inspirator means 18 for mixing air with exhaust gases from internal combustion engines. The other end of the housing encloses the catalyst-containing chamber means 20 for oxidizing undesirable components in the mixture of air and exhaust gases. Partition plate means 22 is mounted within shell member 10 and contacts the inner surface thereof around its periphery. Partition plate means 22 together with end plate 12 define a sound-clamping chamber means within the housing.

Air inspirator means 18 receives exhaust gases from an internal combustion engine, mixes the gas with air, and delivers the air-exhaust gas mixture to the bed of oxidation catalyst. The air inspirator means 18 includes a conduit means 24 which passes through and is sealingly attached about its periphery to end plate 12 and partition plate 22. The conduit means 24 terminates between partition plates 22 and 32 and is open to the space therebetween. The inlet end of the conduit means 24 comprises an exhaust gas inlet means for receipt of exhaust gases from an internal combustion engine. The air inspirator means 18 also includes an air inlet means 26 in conduit means 24 for introducing air from the sound-damping chamber into a stream of exhaust gases passing through conduit means 24. The air inlet means 26 can comprise a series of perforations in conduit means 24, or it can comprise screen elements covering larger openings defined by the walls of conduit means 24, for example. End plate 12 contains passageways 28 communicating with the atmosphere for the introduction of air into the sound-damping means 16. The size of the passageways 28 and the openings of the air inlet means 26 must be sufficiently small to prevent passage of the granular material in the sound-damping means therethrough but of sufficient area to permit the entrance of a sufficient quantity of air into the sound-damping chamber. Filling port and closure 30 is provided in the portion of the shell member defining the sound-damping member means 16 for the introduction of granular materials.

The distance between passageways 28 and air inlet means 26 should be at least one inch and preferably at least 2 inches for effective damping of the sounds from the air inspirator 18. Particularly good sound-damping was observed when end plate 22 was spaced at least one inch and preferably at least 2 inches from air inlet means 26.

The granular materials contained in the sound-damping chamber means 16 should have a particle size in the range from 0.03 to 0.2 inch. Examples of granular materials which can be employed in the sound-damping chamber means include alumina, porcelain chips, kieselguhr, activated clays, ceramic beads, etc. Preferably the granular materials are porous and can include porous alumina, silica-alumina, silica-magnesia, alumina-zirconia, alumina-boria, and silica gels.

Granular oxidation catalysts can be employed to fill sound-damping chamber means 16 in order to oxidize the exhaust gases escaping from the air inspirator 18 in addition to sound-damping. A wide variety of granular catalysts which are useful for oxidizing undesirable components in the exhaust gases of internal combustion engines have been previously disclosed. These catalysts can comprise platinum, palladium, and oxides of vanadium, chromium, copper, manganese, iron, nickel, cobalt, barium, silver, tin, tungsten, etc., and mixtures thereof on either porous or non-porous supports. Porous supports provide a greater activity and are preferred. Suitable porous supports include granular porous alumina, silica-alumina, silica-magnesia, alumina-zirconia, alumina-boria, silica gels, etc.

The particular structural details of the catalysts-containing chamber means 20 is not a part of this invention. A wide variety of devices have been previously developed for contacting exhaust gases with oxidation catalysts. Suitable devices are shown in Patents Nos. 2,674,521 and 2,776,875, for example. In the device shown in FIGURE 1, the catalyst-containing chamber means is defined by one end of shell member 10, end plate 14, and partition plate 32. End plate 14 can be sealingly attached to the shell member 10 adjacent to its edge or it can be mounted in the shell member 10 and sealingly attached about its periphery in the manner shown with respect to end plate 62. Partition plate 32 is mounted in the shell member in the same manner as partition plate 22 and contains passageways 34 which permit the entrance of exhaust gases into chamber 20.

The air-exhaust gas mixture which is delivered from the outlet of conduit means 24 is prevented from entering sound-damping chamber means 16 by partition plate 22. The space between partition plates 22 and 32 serves to distribute the air-exhaust gas mixture across the full area of plate 32 for movement through the passageways 34 into the catalyst-containing chamber means 20 where it contacts the oxidation catalyst. Passageways 34 must be sufficiently small to prevent escape of oxidation catalyst particles from chamber 20 in the event that a single packed catalyst bed arrangement is employed. The oxidation catalysts which are suitable for oxidizing undesirable components in exhaust gases of internal combustion engines have been previously described above.

The space limitations present in most vehicles require a flattened housing design such as shown in FIGURE 1. However, a cylindrical shell member is also contemplated where permitted by the space limitations of the vehicle. The various elements of the device of this invention can be joined together to form a unitary structure by any conventional means. The elements can be bolted together or welded, for example. Welded joints are preferred in view of the stresses created by thermal expansion of the elements during operation of the device.

Alternative embodiments of air-exhaust gas mixing means are shown in FIGURES 2, 3 and 4. These figures illustrate air-exhaust gas mixing devices which are contained in a housing separate from the final exhaust gas oxidation means, but the same general systems can be constructed in a single housing with the final exhaust gas oxidation means in a manner similar to that shown in FIGURE 1.

Referring to FIGURE 2, sound-damping chamber means 40 is defined by shell member 42 and attached end plates 44. Passageways 46 which communicate with the atmosphere allow entrance of air into the chamber means 40. The air inspirator means comprises conduit means 48 which passes through and is attached to the end plates 44.

Conduit means 48 has an inlet end 50 for receipt of exhaust gases from an internal combustion engine and an outlet end 52 for delivery of the air-exhaust gas mixture to the oxidation means. Restriction 54 is mounted in the interior of the conduit means 48 and is attached to the conduit means. The flow of exhaust gases through the restriction 54 creates a low pressure zone adjacent the air inlet means 56 in the walls of the conduit means. The sound-damping chamber 40 is filled with granules 58.

In the operation of the device shown in FIGURE 2, the flow of exhaust gases through conduit means 48 and restriction means 54 creates the low pressure zone which creates a flow of air through air inlet means 56. Air from the atmosphere is drawn into sound-damping chamber means 40 through passageways 46 and travels through the bed of granules 58 to the air inlet means 56. The distance between passageways 46 and air inlet means 56 should be at least one inch and preferably at least 2 inches for effective sound-damping. As with the device shown in FIGURE 1, the granules 58 means can be an oxidation catalyst whereby exhaust gases escaping through air inlet means 56 during the low operational modes of the internal combustion engine are oxidized before they can escape through passageways 46 and to the atmosphere.

FIGURE 3 shows an alternative embodiment of the exhaust gas-air mixing device of this invention similar to that shown in FIGURE 2. The sound-damping chamber means 40 is defined by shell member 60 and end plates 62. The device shown in FIGURE 3 differs from that shown in FIGURE 2 primarily in the location of the passageways 64 in communication with the atmosphere. In this embodiment the passageways 64 are located in shell member 60. The passageways 64 can be located in any arrangement which provides an adequate area for air flow into the sound-damping chamber. Effective sound-damping requires that the distance between the passageways 64 and an air inlet means 56 be at least one inch and preferably 2 inches. In other respects, the construction of the device in FIGURE 3 is similar to that shown in FIGURE 2.

FIGURE 4 shows an alternative embodiment of the exhaust gas-air mixing device similar to that shown in FIGURES 2 and 3. The device shown in FIGURE 4 differs from that shown in FIGURE 3 in the arrangement of the passageways 64 in shell member 60. The passageways 64 are located adjacent only to one end of shell member 60. The distance between the passageways 64 and air inlet means 56 should be at least one inch and preferably 2 inches for adequate sound-damping. Superior sound-damping can be obtained when the distance between end plate 62 and air inlet means 56 is at least one inch and preferably greater than 2 inches.

The exhaust gas oxidation device of this invention solves several serious problems present in previously known venturi-type air mixing devices. Unexpectedly, the high noise level produced by the flow of air into the venturi-type air exhaust gas mixer is greatly diminished with the device of this invention. Surprisingly, even though air is drawn through a bed of porous granules prior to entrance into the venturi mixer, a flow of air is obtained which is adequate for oxidation of exhaust gases by the oxidation catalyst. Furthermore, by employing porous granules in the sound-damping chamber as oxidation catalysts, no escape of exhaust gas from the exhaust gas-air mixer to the surrounding atmosphere is observed.

Obviously many modifications and variations of the invention may be made without departing from the essence and scope thereof, and only such limitations should be implied as are indicated in the appended claims.

We claim:
1. A catalytic device for oxidizing undesirable components in the exhaust gases of internal combustion engines comprising:
   (a) a housing with an exhaust gas inlet and outlet,
   (b) a catalyst-containing chamber means in said housing between the exhaust gas inlet and outlet for oxidizing the vapors in the exhaust gases passing therethrough,
   (c) air inspirator means in said housing between the exhaust gas inlet and the catalyst-containing chamber means for drawing air into the exhaust gas passing therethrough, said air inspirator means including air inlet means,
   (d) a sound-damping chamber means in said housing having passageways for communication with the atmosphere, said sound-damping chamber means communicating with said air inlet means, the distance between the passageways and the air inlet means being at least one inch, said sound-damping chamber containing a bed of oxidation catalyst granules having a particle size within the range of from about 0.03 to 0.2 inch through which air and exhaust gas entering said sound-damping chamber must pass.

2. A catalytic device for the elimination of undesirable components in the exhaust gases of internal combustion engines comprising:
   (a) a catalyst-containing chamber means having an exhaust gas inlet and outlet for oxidizing vapors in the exhaust gas passing therethrough,
   (b) conduit means for receiving exhaust gas and delivering it to said catalyst containing chamber means, said conduit means including an air inspirator means having air inlet means for drawing air into the ex- exhaust gas passing therethrough,
   (c) a sound-damping chamber means communicating with the air inlet means and having passageways for the introduction of air into the sound-damping chamber means containing a bed of oxidation catalyst granules having a particle size within the range of from 0.03 to 0.02 through which air and exhaust gas entering said sound-damping chamber must pass.

3. A catalytic device as described in claim 2 wherein the sound-damping chamber means comprises a housing surrounding the air inlet means, said housing comprising a shell member with opposed end plates attached thereto, the shell member containing passageways for the entrance of air into the sound-damping chamber, the distance between the passageways and the air inlet means being at least one inch.

4. A catalytic device as described in claim 2 wherein the sound-damping chamber means comprises a housing surrounding the air inspirator means, said housing comprising a shell member with opposed end plates attached thereto, at least one of said end plates containing passageways for the entrance of air into the sound-damping chamber, the distance between the passageways and the air inlet of the inspirator being at least one inch.

5. A catalytic device as described in claim 4 wherein the shell member contains passageways in communication with the atmosphere.

References Cited
UNITED STATES PATENTS

| | | | |
|---|---|---|---|
| 2,886,121 | 5/1959 | Welbourn | 181—42 |
| 2,947,600 | 8/1960 | Clayton | 23—288 X |
| 2,995,199 | 8/2961 | Myers | 181—42 |
| 3,176,461 | 4/1965 | Calvert. | |
| 3,252,767 | 5/1966 | Lentz | 23—288 |
| 3,338,682 | 8/1967 | Fowler et al. | 23—288 |

JOSEPH SCOVRONEK, Primary Examiner

U.S. Cl. X.R.
181—36, 51